United States Patent [19]

Maret

[11] 4,360,047

[45] Nov. 23, 1982

[54] TRANSPORTABLE MACHINE-TOOL

[75] Inventor: Jean-Claude Maret, Paris, France

[73] Assignee: Aciers et Outillage Peugeot, Audincourt, France

[21] Appl. No.: 186,805

[22] Filed: Sep. 12, 1980

[30] Foreign Application Priority Data

Sep. 17, 1979 [FR] France ............................ 79 23092

[51] Int. Cl.³ ............................................. B27C 1/14
[52] U.S. Cl. ........................... 144/117 R; 144/286 R; 182/153; 269/901
[58] Field of Search ............. 248/166, 434; 182/153; 269/901; 144/286 R, 114 R, 117 R, 129

[56] References Cited

U.S. PATENT DOCUMENTS

| | | | |
|---|---|---|---|
| 4,073,484 | 2/1978 | Beekenkamp | 144/286 R |
| 4,236,599 | 12/1980 | Luff | 182/153 |
| 4,268,020 | 5/1981 | Wood | 269/901 |

*Primary Examiner*—W. D. Bray
*Attorney, Agent, or Firm*—Sughrue, Mion, Zinn, Macpeak and Seas

[57] ABSTRACT

The machine-tool comprises a support forming a work table and containing an electric driving motor, a machining unit associated with the motor, and feet means. The feet means comprises two foldable feet which have a flattened bow-shaped structure and are pivotally mounted adjacent their ends on two ends of the support. The flattened portion of each foot forms a region of the foot for bearing on the ground. The dimensions and the shapes of the bow-shaped structures are such that, on one hand, the support is capable of passing therethrough in the course of the relative angular displacements of the support and the feet and that, on the other hand, the feet are capable of passing one inside the other in the course of the angular displacements. The feet means further comprises means for immobilizing the feet in the unfolded position thereof.

18 Claims, 11 Drawing Figures

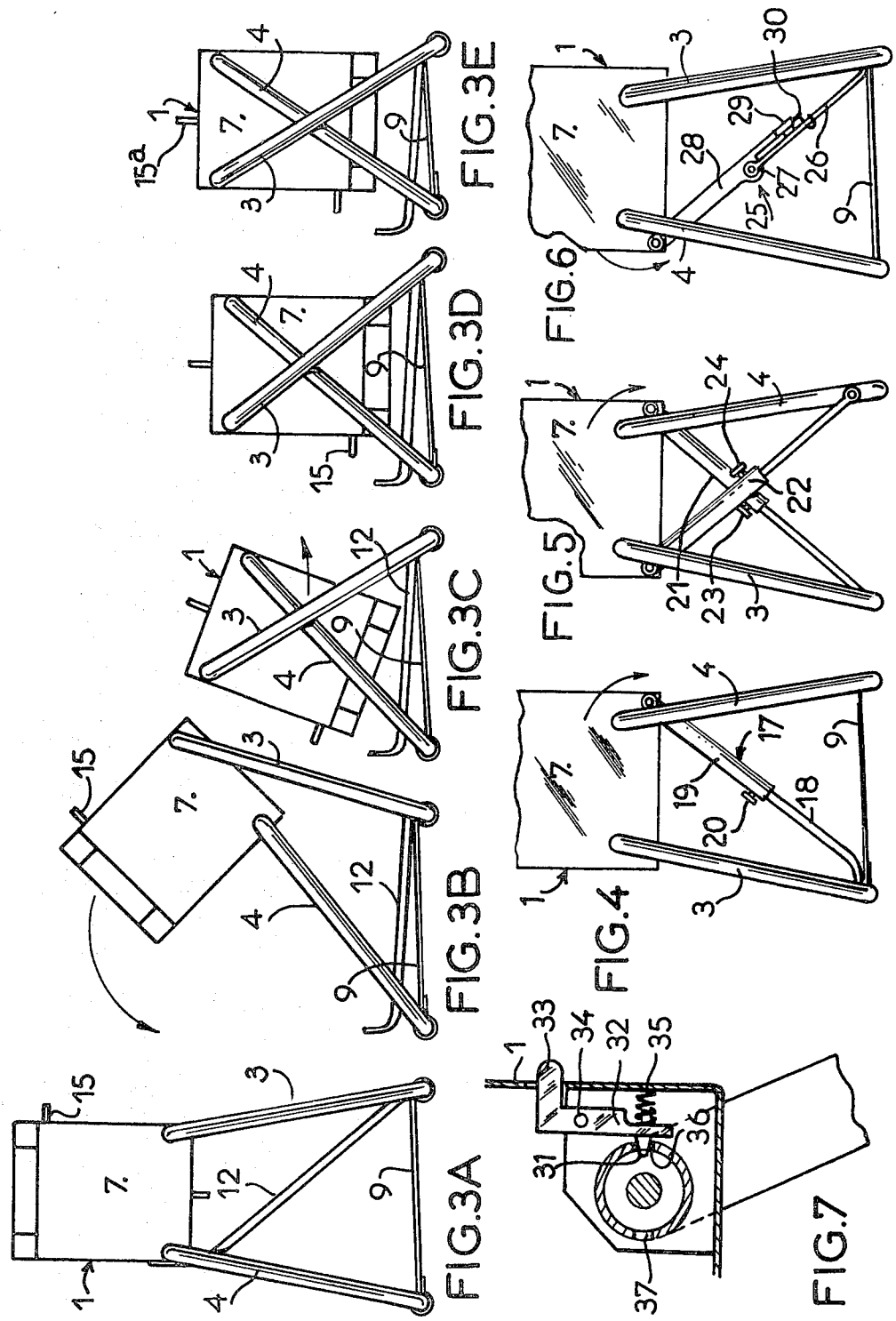

TRANSPORTABLE MACHINE-TOOL

The present invention relates to transportable machine-tools.

Do-it-yourself enthusiasts are equpped with tools which are increasingly complete and perfected and in particular drilling, spindle moulding, planing, sawing or like machines.

Among existing equipment there may be mentioned a table or support which is equipped with an electric motor and on which may be fixed as desired various tools designed for being coupled with the motor.

Such equipment is space-consuming and is difficult to put away.

Further, it cannot be easily transported by a single person.

Consequently, the tendency is to return to so-called integral machines which comprise a driving motor which is associated in a permanent manner with a given tool.

Such a conception enables the tool to be considerably lightened but in view of the fact that a table or support must be associated with each tool, the overall size of the unit is considerable.

An object of the invention is to overcome this drawback and to provide an integral machine which has such weight and overall size that it can be easily placed in position, put away and transported.

According to the invention there is provided a machine, and in particular a machine-tool, comprising a support forming a work table, containing an electric driving motor and a machining unit associated with said motor and feet means, wherein the feet means comprises two foldable feet in the form of flattened bow structures, each of which is pivoted by its end portions on two opposed end portions of the support, the flattened portion of each foot forming a region for bearing on the ground, the dimensions and the shapes of said bow structures being such that, on one hand, the support is capable of passing therethrough in the course of relative angular displacements of the support and feet and, on the other hand, the feet can pass one inside the other in the course of said displacements, said feet means further comprising means for holding the feet in the unfolded position.

Further features of the invention will be apparent from the ensuing description with reference to the accompanying drawings which are given solely by way of example and in which:

FIGS. 3a to 3e show various stages in the movement required for changing the machine according to the invention from its working position shown in FIG. 3a to its folded position shown in FIG. 3e;

FIGS. 4, 5 and 6 are partial views of the machine according to the invention showing modifications of the means for holding the feet means in position, and, FIG. 7 is a partial sectional view to an enlarged scale of another embodiment of means for locking the feet of the machine according to the invention in position.

Figure 1:
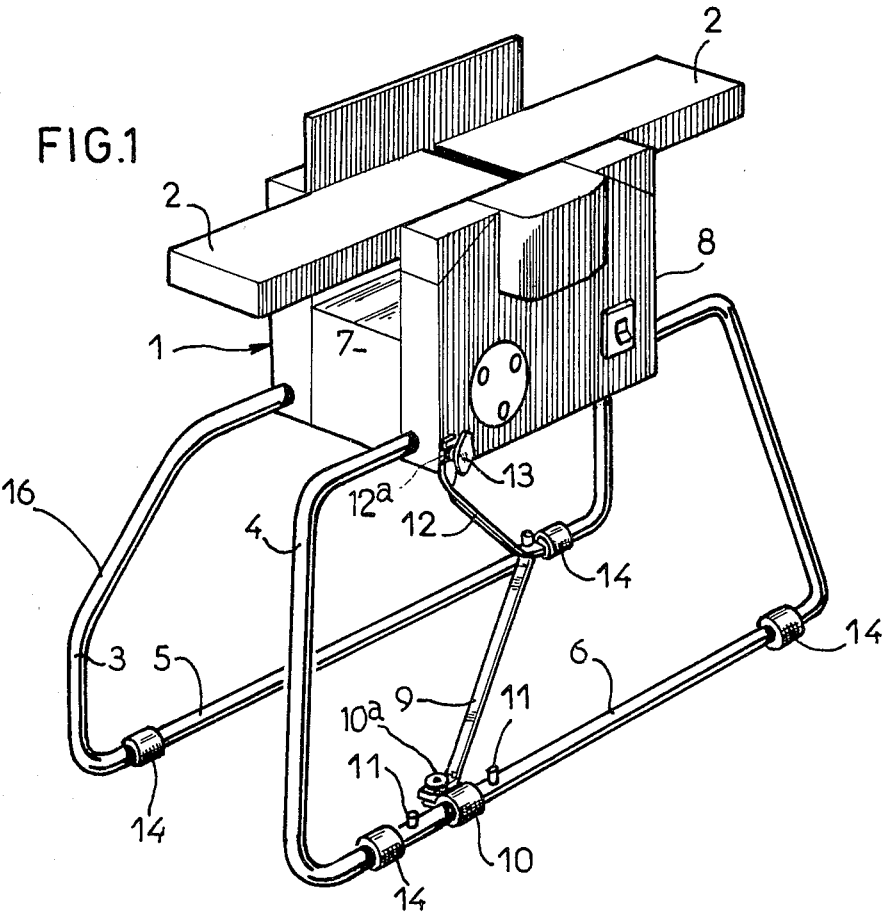
FIG. 1 is a perspective view of a machine-tool according to the invention shown in its unfolded working position.
Figure 2:
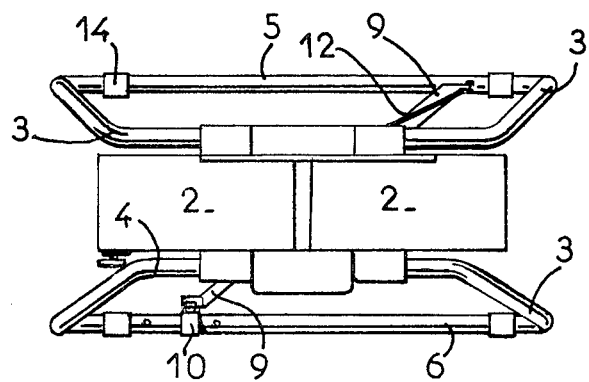
FIG. 2 is a plan view of the machine-tool of FIG. 1.

With reference first to FIG. 1, the invention is shown as being applied to a planing-truing up machine whose body 1 containing an electric driving motor and the mechanism of the machine (not shown) has a parallel-sided shape and comprises in its upper part two elongated plates 2 which constitute the work table of the machine.

In the vicinity of the side of the body 1 opposed to the plates 2 there are pivotally mounted two feet 3 and 4 having a bow shape and flattened portions 5 and 6 respectively which act as regions for bearing on the ground. Each of the feet 3 and 4 is pivotally mounted adjacent its ends on two opposed sides 7, 8 of the body 1. For this purpose apertures for receiving the end portion of the feet 3 and 4 are formed in the sides 7 and 8 of the body 1.

The feet are advantageously constructed from suitably bent sections of tube.

The feet 3 and 4 are interconnected by holding means which, in the embodiment shown in FIG. 1, comprise a diagonal cross-member 9 pivotally mounted on one end portion of the rectilinear portion 5 of the foot 3 and connected to the opposite end portion of the rectilinear portion 6 of the foot 4 by a sleeve 10 which is sidably mounted on the rectilinear portion 6 between two pins 11 constituting stops for the movement in translation of the sleeve 10. The sleeve 10 may be held stationary on the rectilinear portion 6 by means of a screw having an actuating head 10a. On the end of the cross-member 9 pivotally mounted on the rectilinear portion 5 of the foot 3 there is pivotally mounted a reinforcing strut 12 whose opposite end is fixed on the lateral side of the body in the vicinity of the pivotal mounting of the foot 4 on the body remote from the pivotal mounting of the strut 12 on the rectilinear portion 5 of the foot 3. In the embodiment of FIG. 1, the strut 12 is fixed to the body 1 by means of a screw 13 having an actuating head and engaged in a fork 12a of the strut. The assembly comprising the two feet 3, 4, cross-member 9 and the reinforcing strut 12 form the feet means of the machine according to the invention. The dimensions of the feet 3, 4 having a bow shape are chosen, on one hand, in such manner as to have rectilinear portions 5, 6 which are long enough to ensure good stability of the machine on the ground and, on the other hand, in such manner that in the course of the angular displacements of the body 1 relative to the feet 3, 4 for the purpose of folding up the feet means, the body 1 is capable of passing through the bow-shaped structures of the feet.

The feet structure is completed by four shoes formed by sleeves 14 disposed adjacent the ends of the rectilinear portions 5 and 6 of the feet 3 and 4 and adapted to ensure an improved adherence of the machine on the ground.

FIG. 3a shows the machine according to the invention in the unfolded position and a description will now be given of the manner in which its feet means can be folded up.

In order to facilitate the handling, the machine comprises on one of its lateral sides a handle 15. For the purpose of folding up the feet means, the reinforcing strut 12 is first released at the end thereof fixed to the body 1 by unscrewing the screw 13. Then, while holding the body 1 by means of the handle 15, it is tipped in the direction of the arrow shown in FIG. 3b about its pivotal mountings on the foot 3. It will be observed on this occasion that the weight of the body 1 is in major part supported by the foot 3 so that this considerably facilitates the operation. The tipping movement is continued so as to cause the body to reach the position shown in FIG. 3c. It can be seen that, in this position, the weight starts to be distributed once more between the two feet 3 and 4. Moreover, it will be observed that the foot 4 has crossed the foot 3 by passing inside the latter. This is possible owing to the presence on the foot 3 (as can be seen in FIG. 1) of oblique lateral portions 16 which allow the passage of the foot 4 inside the bow-shaped structure of the foot 3.

The movement is then continued until the body 1 reaches the position shown in FIG. 3d in which its weight is equally distributed between the two feet 3 and 4.

There remains to move the rectilinear portions 5 and 6 of the feet 3 and 4 toward each other by the unclamping and sliding of the sleeve 10 so that the distance between the feet is roughly equal to the overall width of the body 1 as shown in FIG. 3e and to once more immobilize the sleeve by means of the screw 10a so as to maintain the feet 3 and 4 in the drawn together position thereof.

The machine can then be transported by means of the handle 15a provided on the side thereof opposed to the work table.

In the embodiment shown in FIG. 4, the reinforcing strut 12 is replaced by a slidable reinforcing strut 17 which has a portion 18 formed by a solid rod which is pivotally mounted adjacent one of its ends, on the rectilinear portion 5 of the foot 3 in the region of the pivotal mounting of the diagonal cross-member 9 and extending at its opposite end into a tubular portion 19 which is pivotally mounted on one of the sides 7 on which the end portions of the feet 3 and 4 are pivotally mounted. The elements 18 and 19 of the struts 17 are relatively immobilized by means of a screw, stud or like means 20.

In the embodiment shown in FIG. 5, the immobilizing means for the feet 3 and 4 are formed by two telescopic struts 21, 22 similar to the struts 17 of FIG. 4 which are respectively pivotally mounted between one end of a rectilinear portion 5, 6 of one foot 3, 4 and a side 7, 8 of the body 1 on which the pivotal mountings of the feet 3 and 4 are provided. Screws 23 and 24 respectively immobilize the struts 21 and 22.

It will be understood that the latter may be replaced by a strut in a single piece which is pivotally mounted in the same manner on the body 1 and the feet 3 and 4, or by cylinder devices. The cylinder devices exert a force which facilitates the unfolding of the machine.

There may be employed to advantage cylinder devices so as hydropneumatic springs of the mark STABILUS sold under the name LIFT-OF-MAT of standard type reference number 03-08-215-111. Cylinder devices of the mark BOGE may also be employed.

In the embodiment shown in FIG. 6, there is found a cross-member 9 similar to that of FIG. 1 but the reinforcing strut is here formed by a compass structure 25 consisting of a solid rod 26 which is pivotally mounted at a point 27 on a link 28 which has one end portion 29 forming an angular abutment for the rod 26. The other end of the link 28 is pivotally mounted on one of the sides, such as side 7, of the body 1, whereas the end of the rod 26 opposed to the pivotal mounting 27 is connected to the rectilinear portion of the foot 3 in the manner already described with reference to FIG. 1. At the end 29 of the link 28 there is provided a locking means 30 adapted to prevent the accidental folding of the compass structure.

FIG. 7 shows means for immobilizing the feet in the region of their pivotal mountings in the body 1 of the machine. These means comprise a pin 31 carried by a lever 32 which has one end 33 projecting from the body 1 so as to enable it to be shifted. This lever 32 is pivotally mounted on the body 1 by means of a pin 34 and is biased by a spring 35.

The pin 31 is adapted to enter orifices 36 and 37 formed in the corresponding end portion of each foot which extends into the body 1, the positions of the orifices 36 and 37 corresponding to the angular positions that each foot must occupy in the folded up position and unfolded position respectively of the feet means.

It will be understood that with the immobilizing means such as those shown in FIG. 7 associated with each of the pivotal mountings of the feet 3 and 4 on the body 1, the reinforcing structures become unnecessary and if the feet have in themselves sufficient stiffness the use of a spacer cross-member such as the cross-member 9 of the embodiments shown in FIGS. 1, 4 and 6 may be dispensed with.

The feet means just described is applicable to integral machines of various types. It is sufficient that the overall size of the body of the machine be such that the body is capable of passing through the bow structures formed by the feet of the feet means in order to permit the unfolding and folding up operations.

The arrangement just described provides integral machines which have a small overall size when they are folded up and are consequently easily transportable.

Further, the fact that in the course of the unfolding or folding up operations, the major part of the weight of the body of the machine is supported by at least one of the feet forming the feet means, the handling of the machine during these operations is considerably facilitated.

Having now described my invention what I claim as new and desire to secure by Letters Patent is:

1. In a collapsible machine, in particular a machine-tool, comprising a support forming a work table and containing an electric driving motor and a machining unit associated with said motor, and feet means; the improvement wherein said feet means comprises two foldable feet each in the form of a flattened bow-shaped structure, each foot having two end portions and a flattened portion and being pivotally mounted on two ends of the support by said end portions, the flattened portion of each foot constituting a region for bearing on the ground, both of said bow-shaped structures being dimensioned and configured to circumscribe an area greater than that of a maximum vertical section of said support to enable the support to freely pass through both of said structures during a pivotal collapse of said machine from an erected, operable configuration to a folded, transport and storage configuration, and a first one of said bow-shaped structures being dimensioned and configured to circumscribe an area greater than that of a second one of said bow-shaped structures to enable said second structure to at least partially pass through said first structure during a pivotal collapse of said machine, said feet being approximately parallel in said erected configuration with the support disposed above them, and crossed in said folded configuration with the support disposed within them, said feet means further comprising means for immobilizing the feet in an unfolded position thereof.

2. A machine as claimed in claim 1, wherein the support has a parallel-sided shape and the feet are pivotally mounted on two opposed lateral sides of the support, said end portions of the feet being engaged in means defining corresponding apertures of said lateral sides.

3. A machine as claimed in claim 1, wherein said means for immobilizing the feet comprise a diagonal cross-member having two end portions which are respectively pivotally mounted on the feet adjacent an end of the corresponding flattened portion which is rectilinear, and a reinforcing strut connected to one of the feet and to a region of the support which is located on a side of the support opposed to said one foot.

4. A machine as claimed in claim 3, wherein said diagonal cross-member is pivotally mounted on the rectilinear portion of the feet by means of a sleeve which is slidably mounted on said rectilinear portion, two abutments being provided on said rectilinear portion between which the sleeve is slidable, and means for immobilizing the sleeve in translation.

5. A machine as claimed in claim 1, wherein said means for immobilizing the feet comprise two reinforcing struts each of which has an end portion pivotally mounted on a corresponding foot and a second end portion pivotally mounted on a side of the support of the machine.

6. A machine as claimed in claim 3, wherein the reinforcing strut comprises a rod and releasable fixing means for one of the ends of the rod.

7. A machine as claimed in claim 3, wherein the reinforcing strut comprises a telescopic structure.

8. A machine as claimed in claim 3, wherein the reinforcing strut comprises a compass arrangement having two pivoted branches and means for preventing rotation of the branches with respect to each other beyond an alignment of said branches.

9. A machine as claimed in claim 3, wherein the reinforcing strut is a cylinder and piston device.

10. A machine as claimed in claim 3, wherein the reinforcing strut comprises a telescopic arrangement of members and means for blocking the members of the telescopic arrangement in an extended position thereof.

11. A machine as claimed in claim 3, wherein the reinforcing strut comprises a compass arrangement having pivoted branches and means for blocking the branches against an accidental folding up of the compass arrangement.

12. A machine as claimed in claim 5, wherein each reinforcing strut comprises a rod and releasable fixing means for one of the ends of the rod.

13. A machine as claimed in claim 5, wherein each reinforcing strut comprises a telescopic structure.

14. A machine as claimed in claim 5, wherein each reinforcing strut comprises a compass arrangement having two pivoted branches and means for preventing rotation of the branches with respect to each other beyond an alignment of said branches.

15. A machine as claimed in claim 5, wherein each reinforcing strut is a cylinder and piston device.

16. A machine as claimed in claim 5, wherein each reinforcing strut comprises a telescopic arrangement of members and means for blocking the members of the telescopic arrangement in an extended position thereof.

17. A machine as claimed in claim 5, wherein each reinforcing strut comprises a compass arrangement having pivoted branches and means for blocking the branches against an accidental folding up of the compass arrangement.

18. A machine as claimed in claim 1 or 2, wherein said means for immobilizing the feet comprise, in the region of at least one pivotal mounting of each foot on the support of the machine, a pin carried by an actuating lever which is pivotally mounted on the support, and means defining orifices are provided in the corresponding end of each foot for cooperation with said pin.

* * * * *